United States Patent Office 3,462,932
Patented Aug. 26, 1969

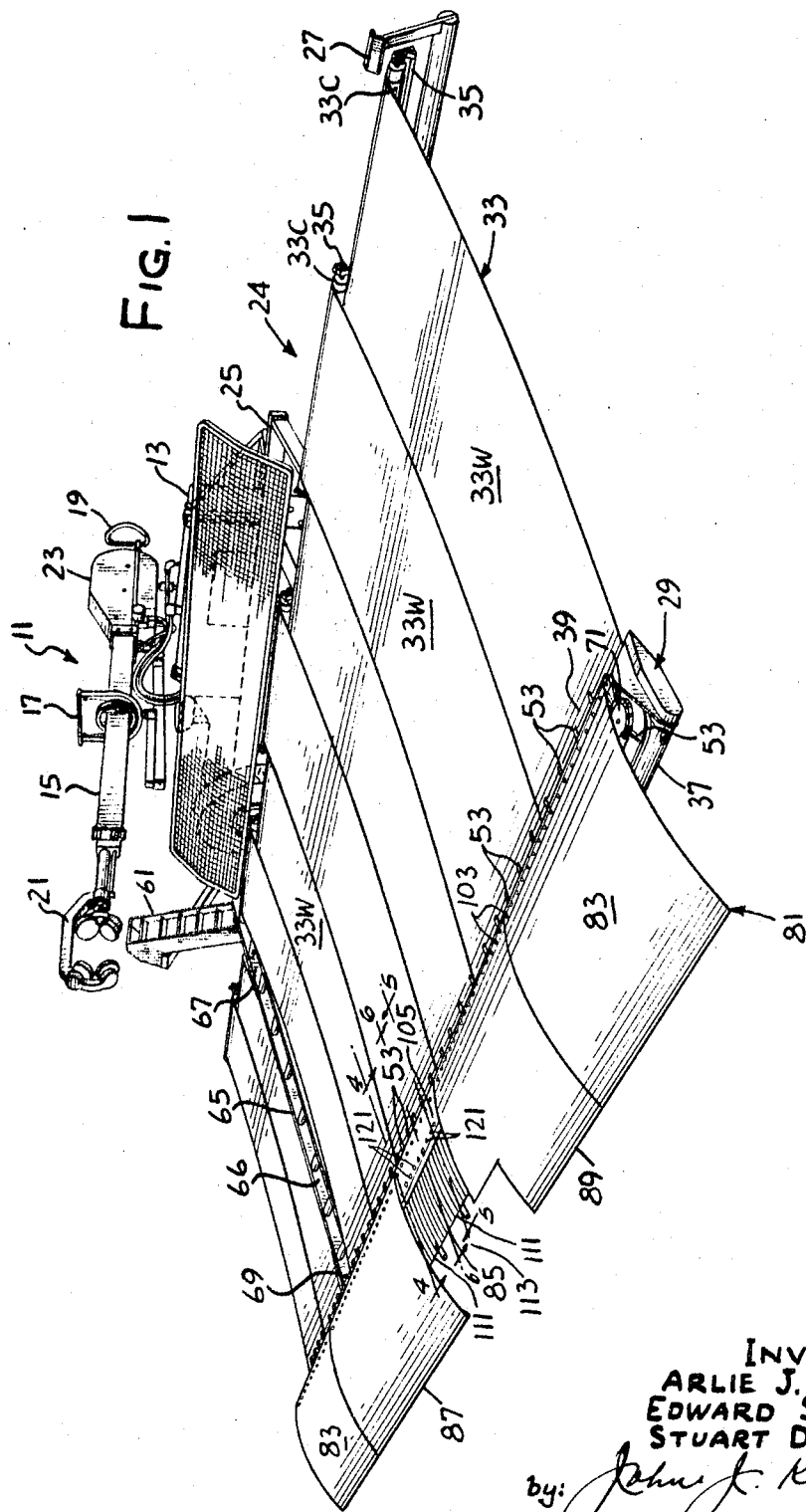

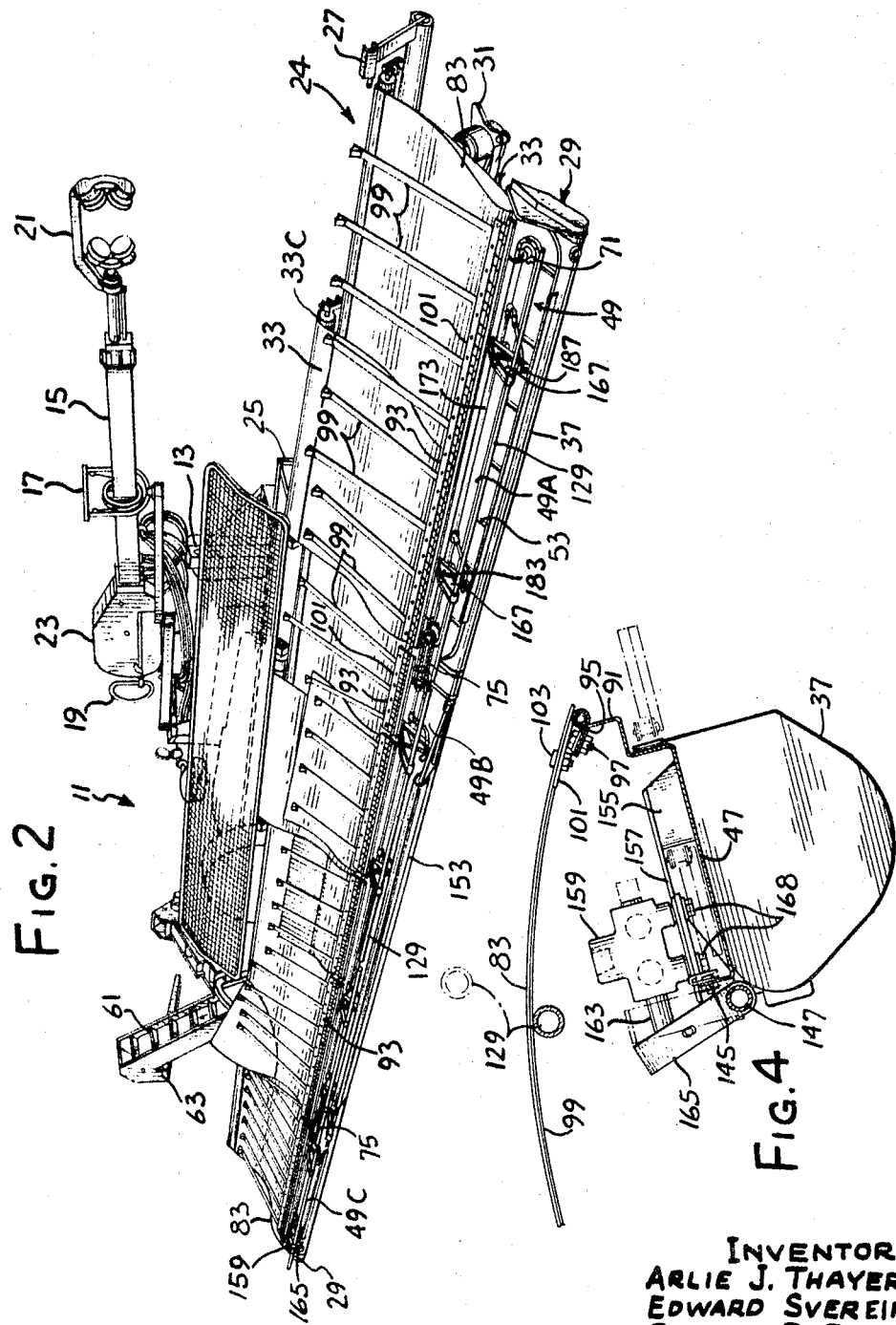

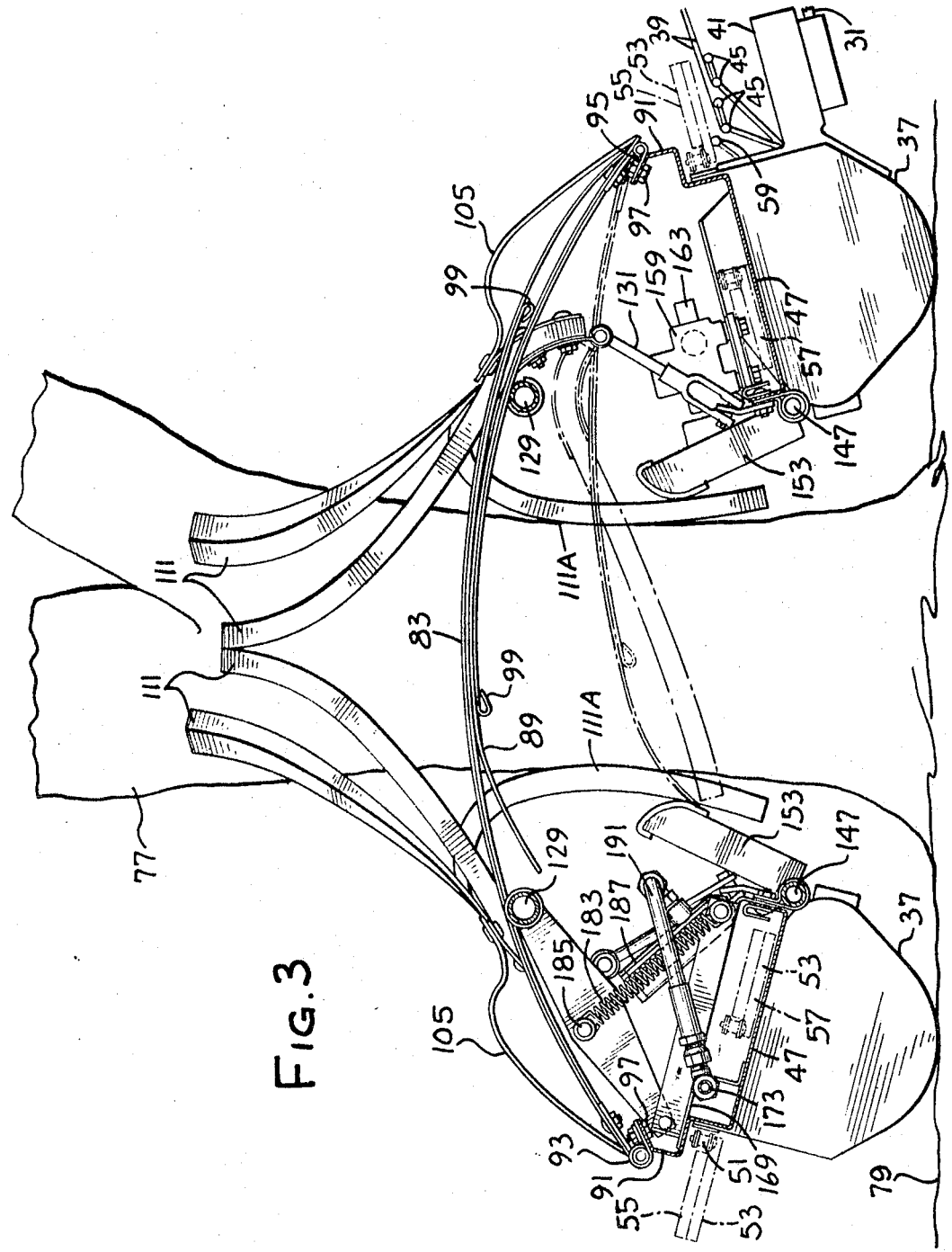

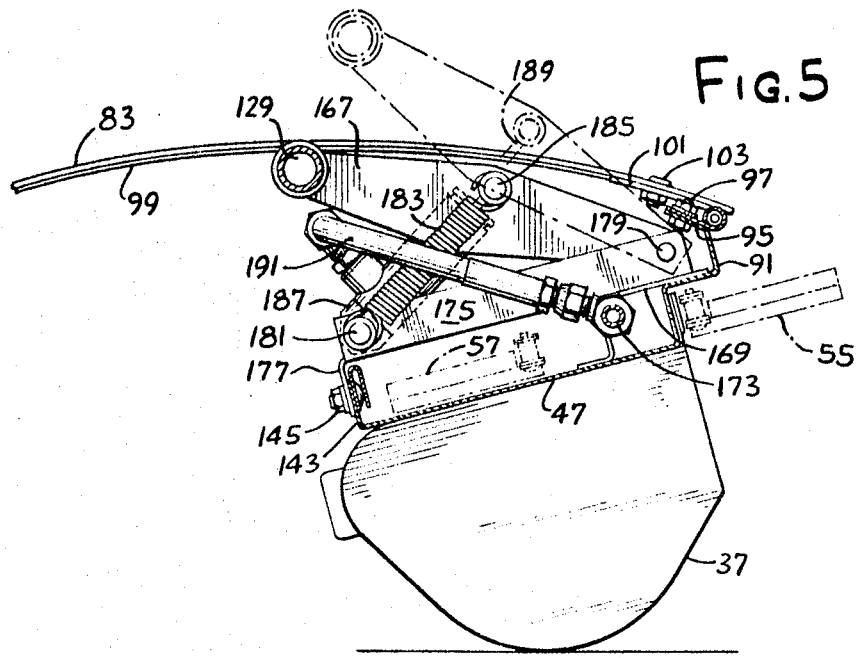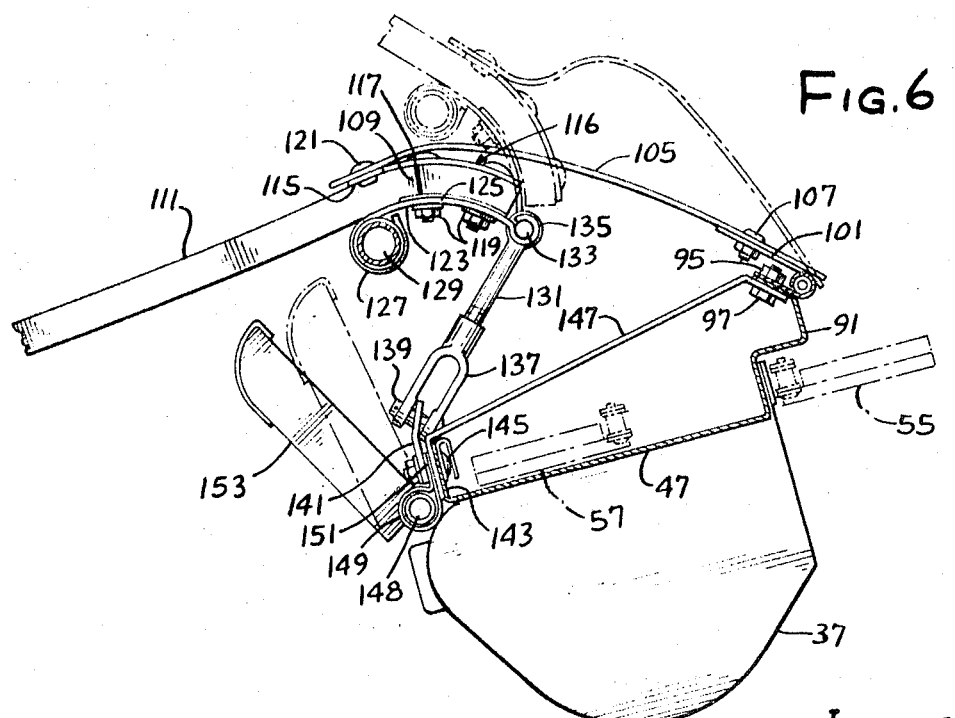

3,462,932
FRUIT CATCHER
Stuart D. Pool, Naperville, Edward Svereika, Chicago, and Arlie J. Thayer, Brookfield, Ill., assignors to International Harvester Company, Chicago, Ill., a corporation of Delaware
Filed Oct. 31, 1966, Ser. No. 590,945
Int. Cl. A01g 19/06
U.S. Cl. 56—329  8 Claims

ABSTRACT OF THE DISCLOSURE

A fruit catcher having an apron and medial and end sections on the treeward edge adapted to be tilted to gravitate fruit onto the apron, the medial section comprising a tree-engageable actuator, a linkage operated by the actuator for flipping the center section upwardly, and the center section functional to return against the tree to provide an incline for leading fruit dropped thereupon onto the apron.

---

This invention relates to fruit harvesting devices. Particularly it relates to a fruit catcher. Specifically it relates to catcher apron construction. Attention is directed to copending application Ser. No. 590,784 filed Oct. 31, 1966 for Fruit Catcher.

A conventional fruit catcher of the class which the present invention concerns comprises a self-propelled carrier adapted to move from place to place within an orchard. A catcher apron assembly is arranged on the carrier for extension in fruit catching attitude toward a tree to be harvested. Reciprocative tree shaker means, which may be mounted for translocation with the carrier, have a limb-engaging portion through which reciprocative shaker forces can be transmitted to a tree for dislodging fruit. The catcher apron assembly comprises web means which, when conditioned for fruit catching, are arranged to gravity feed fruit toward fruit collection means. The latter comprises a conveyor which is arranged along a treeward portion of the apron assembly and is adapted to be supported on the ground to facilitate gravity feed. The catcher apron assembly of a conventional fruit catcher may include a flap assembly which projects treewardly from the web means over the conveyor. An outer marginal portion of the flap assembly is adapted for engagement partially about a tree to be harvested. Means are provided for adjusting the angular attitude of the flap assembly to gravity feed fruit that falls thereon toward the conveyor.

Fruit catchers of the indicated class generally are employed in opposed pairs arranged on opposite sides of a tree. When conditioned for fruit catching, their flap assemblies extend into engagement with each other for the purpose of catching all fruit shaken from a tree. However, complete efficiency is not achievable when employing conventional devices because of gaps which form between flap assemblies and a tree and between adjoined flap assemblies through which harvested fruit may fall to the ground. Moreover, fruit loss may be experienced as a result of inadequacy of prior means for feeding all harvested fruit falling on the flap assemblies toward their fruit collection means.

In accordance with the present invention, and as an object thereof, an improved fruit catcher is provided.

It is another object of the invention to provide an improved apron assembly in a fruit catcher and the like.

It is a further object of the invention to provide a fruit catcher adapted for use in pairs on opposed sides of a tree and having a catcher apron assembly adapted for association with and opposed thereof in fruit-catching relationship about a tree, and improved gap-closing means adapted to minimize loss of harvested fruit from about a tree and between adjoining apron assemblies.

It is further an object of the invention that the gap-closing means be adapted for arrangement to feed thereon falling fruit toward a common fruit collection station.

The foregoing and other objects, features, and advantages of the present invention will become more apparent upon consideration of the following description and appended claims when considered in conjunction with the accompanying drawings wherein the same reference character or numeral refers to like or corresponding parts throughout the several views.

On the drawings:

FIG. 1 is a perspective view of a fruit catcher embodying the present invention conditioned for fruit catching.

FIG. 2 is a perspective view of said fruit catcher conditioned for transport and showing its shaker mechanism at an aspect different from that of FIG. 1.

FIG. 3 is an end view of a conveyor housing and its associated flap assembly of said fruit catcher arranged in fruit catching condition in association about a tree with a like combination, the latter being viewed from an opposite end, parts being omitted for the purpose of illustration, parts being shown in phantom to illustrate pre-fruit catching condition.

FIGS. 4, 5, and 6 are parallel transverse sectional views through said conveyor housing and flap assembly in pre-fruit catching condition, parts being shown in phantom to illustrate fruit catching condition.

Referring now more particularly to the drawings, in FIGS. 1 and 2 there is seen a fruit catcher generally designated 11. Said fruit catcher comprises a carrier 13 which herein is shown as a self-powered farm vehicle such as a tractor. A boom assembly 15 is elevatably arranged on the carrier by any suitable means which may include a mount member 17. The latter provides an axis medially of the boom assembly 15 about which said assembly may be rockably adjusted. Through the medium of a handle 19 secured at one end of the boom, the aspect of a limb-engageable yoke 21 arranged at the other end of said boom assembly can be varied. A shaker mechanism 23, which comprises a component of said boom assembly, is arranged from its handle end for transmission of limb-shaking torque to said limb-engageable yoke.

A catcher apron assembly 24 comprises framework 25 and thereby supported web means 33. Framework 25, which may be of known construction, is suitably secured to carrier 13. Said framework comprises an inner fixed or carrier-proximate section 27, which extends along one side of carrier 13, and an outer frame section 29 which is disposed substantially parallel to and below frame section 27 and comprises the tree-proximate side of framework 25. A medial frame portion 31, only a part of which is seen in FIG. 3, is collapsably arranged from inner frame section 27 for downward angular extension of outer frame section 29 to the position of FIG. 1 and withdrawal to the position of FIG. 2. Framework 25 is arranged in a manner such that when it is conditioned as in FIG. 1, frame section 29 is supported on the ground 79 (FIG. 3).

Web means 33 comprises a plurality of adjoining overlapping rollable web sections 33W, only some of which have been identified in FIGS. 1 and 2. Said web sections are arranged for extension toward and away from frame section 27, and are disposed in overlapping relationship longitudinally of the carrier 13. Moreover, in the illustrated embodiment, sufficient web sections are provided to extend said web means beyond front and rear ends of said carrier. Said web means comprises a plurality of spring biased cylinders 33C, only some of which have been numbered in the drawing, for control of said web sections in window shade fashion. The inner frame section 27 comprises conventional supports 35 for rotational mounting of cylinders 33C at stations which cause web sections 33W to be disposed in a downwardly and outwardly sloping plane in overlapping association when extended in catching attitude. Thereby, fruit falling on said web means will be gravity fed toward its tree-proximate end portion 39.

The outer or treeward frame section 29 comprises a pontoon-shaped conveyor housing 37 which extends along substantially the entire end portion 39. Housing 37 has an inward extension 41 which is disposed beneath said tree-proximate end portion 39. Anchoring means 45 (FIG. 3) of any suitable construction are carried by said inward extension for securing end portion 39 of each web section 33W.

Housing 37 has an elongated cover 47. Driven conveyor means 49 are mounted on housing 37 and extend along substantially the entire end portion 39 of web means 33. Said conveyor means comprises cooperatively associated endless link chains 51 having outwardly extending flights 53 which are shown in phantom in FIG. 3 and only some of which have been numbered in FIG. 1. Said flights are arranged in a work course 55 and return course 57. A fixed support comprising a rod 59 (FIG. 3) extends from housing 37 above housing extension 41 in supportive association with said flights of work course 55. Cover 47 provides a base above which return course 57 is arranged. The disposition of cover 47 and rod 59 is such that flights 53 of work course 57 are arranged in sweeping association with the upper surface of the tree-proximate end portion 39 of the web means 33.

A second elevator 61 is arranged at the rear end of carrier 13. Said second elevator is adapted to carry fruit in a generally upward direction. The housing of said second elevator defines a downwardly directed delivery chute 63 which is in receiving association with said second elevator and from which fruit is dischargeable into a collection container (not shown). The lower end of the second elevator 61 is arranged in receiving association with a thereto normally extending first elevator 65 (FIG. 1). Said first elevator has an upper opening 66 adapted for disposition in the plane of web means 33 when extended. Said first elevator may be disposed between a pair of web sections 33W along their adjoining side margins, as illustrated in FIG. 1. Said first elevator has an upper end portion 67 which is arranged in delivery association with the lower end portion of said second elevator. Additionally, the first elevator has a lower outer end portion 69 which is arranged in fruit receiving association with conveyor means 49.

The foregoing arrangement places outer or receiving end portion 69 of said first elevator at a station medial of the opposite ends of conveyor means 49. In the present embodiment, the conveyor means 49 comprises a plurality of conveyor sections 49A, 49B, and 49C (FIG. 2), each having its individual endless link chain 51 and associated flights 53 are arranged for fruit delivery to the first elevator. In the present embodiment, the disposition of the first elevator is such that its lower end is arranged in receiving association between conveyor sections 49B and 49C.

Conveyor means 49 comprises a driven sprocket 71 which is operated by suitable power means which may be conventional. Sprocket 71 drives the link chain 51 comprising conveyor section 49A. A plurality of connector sprocket assemblies 75, only one of which is numbered in FIG. 2, are arranged in a conventional fashion to transfer drive torque from said last link chain to the link chains of the other conveyor sections. The arrangement is such that the direction of rotation of all link chains 51, except for the chain connected with conveyor section 49C, is the same. Conveyor section 49C, however, is disposed on a side of said first elevator opposite to the other conveyor sections. Accordingly, the direction of its chain feed will be opposite the chain feed of the other conveyor sections. Suitable torque transfer means, not clearly in evidence in the drawings but which are well known in the art, may be employed to impose required reverse torque on chain 51 of conveyor section 49C.

A flap assembly generally designated 81 (FIG. 1) comprises a plurality of adjacent sections, said sections herein being a pair of opposite end sections 83, a center section 85, and a pair of additional sections 87 and 89 disposed between said center section 85 and the opposite end sections 83, as illustrated in FIG. 1. Said flap assembly is adapted to cover housing 37 and project treewardly therefrom. Said last assembly serves as the treewardmost component of the catcher when it is fully extended, as in FIG. 1.

As illustrated in FIGS. 3–6, inclusive, a bracket 91 map be fashioned integrally with cover 47. Bracket 91 extends longitudinally of the housing 37 above which it projects along its carrier side. Hinge means, comprising a plurality of hinge sections 93 which are lineally arranged, have fixed plates 95 which are secured to the brackets 91 by a conventional connecting means 97, herein comprising opposed lock nut assemblies. A plurality of arcuate flexible metal spring arms 99, only some of which have been numbered in FIG. 2, have their inner ends rigidly secured by welding or the like to the rockable plate 101 (FIG. 2) of each hinge section 93. Said spring arms are spaced from each other longitudinally of housing 37 to which they are adapted to extend transversely. The length of said spring arms may be a little less than the length of the flap sections supported thereby.

The flap sections 83, 87, and 89 are adapted to lie loose on the arms 99 along all marginal portions except their inner. The latter are anchored to adjacent rockable hinge plates 101 by means of suitable fasteners 103 (FIGS. 4 and 5) which in the instant embodiment are shown as screw and nut assemblies. The medial flap section 85 is not supported by any of spring arms 99. It comprises a wide fabric band 105 (FIGS. 1 and 6) which extends longitudinally of a medial section of conveyor housing 37. The inner marginal portion of said fabric band is rigidly secured to an adjacent rockable hinge plate 101 by means of any suitable fasteners 107, herein shown as a screw and nut assembly.

By reason of the foregoing construction, spring arms 99 as well as flap assembly 81 may be manually folded back, as in FIG. 2, to facilitate transport of said fruit catcher, in an orchard, for example.

The inner end portions 109 (FIG. 6) of a plurality of elastomer strips or fingers 111 are secured to the outer marginal portion of fabric band 105. Strips 111 may be fabricated from tire casing, and are disposed in side-by-side relationship, as illustrated in FIG. 1. The assembly of strips 111 and band 105 is short of the outer marginal edge of flap asembly 81 and generates a tree-receiving recess 113 between the flap sections 87 and 89.

The inner end portions 109 of strips 111 are secured in a holder 116 comprising a pair of upper and lower arcuate plates 115 and 117 (FIG. 6) by means of suitable fasteners 19, such as bolt and nut assemblies. The outer end portion of fabric band 105 is secured by means of rivets 121, or the like, to the outer marginal portion of the plate 115. Thereby, said holder 116 underlies fabric band 105.

Each of a pair of biasing springs 123 (only one is shown in FIG. 6) has an intermediate leaf portion 125 and outer coiled portions 127. Said springs are disposed in opposed spaced apart relationship longitudinally of housing 37 at opposite sides of web section 85. The leaf portion 125 of each of said springs is rigidly secured by a pair of said fasteners 119 along the under surface of arcuate plate 117.

An attitude control arm 129 which extends longitudinally of said conveyor housing 37 supports from below the inner end portions 109 of said strips 111. The outer end portions 127 of said springs are coiled about said attitude control arm in a manner such that strip holder 116 is biased counterclockwise with respect to FIG. 6.

A pair of parallel outwardly extending arms 131 (only one is seen in FIG. 6) are arranged at opposite sides of flap section 85 beneath band 105. The arms 131 have aligned inner apertured ends, and a shaft 133 is mounted in the apertured ends of said arms. Each spring 123 has an inner end which is fashioned as an eyelet 135 and rockably engaged about shaft 133. Arms 131 are proportioned so that shaft 133 is disposed adjacent the inner end portions 109 of said strips.

From its inner or shaft-supporting end, each of said last arms extends outwardly and downwardly, the outer end of said arms each defining a clevis 137. The latter are springingly connected to housing 37. For that purpose, an angularly disposed pin 139 is retained in the outer ends of the arms of each clevis 137. The upper end of a bent spring plate 141 is engaged about each pin 139 between the arms of its clevis. An elongated upwardly extending boss 143 is formed integrally with the housing cover 47 along its outer side. The lower end of each spring plate 141 is rigidly secured to boss 143 by means of a fastener assembly 145, herein comprising an associated nut and bolt.

A plurality of braces 147, only one of which is seen in FIG. 6, are rigidifyingly arranged in spaced relationship longitudinally of housing 37 transversely of which said braces are disposed. Opposite ends of said braces are secured to the bracket 91 and boss 143 by means of heretofore identified fastener assemblies 97 and 145, respectively.

An elongated shaft 148 is journalled along the outer side of conveyor housing 37, a portion of said shaft being disposed beneath flap section 85. Longitudinally extending spring means 149 is arranged about shaft 148 in a manner such that said shaft is biased counterclockwise with respect to FIG. 6. Upwardly turned opposite end portions 151 of said spring means are rigidly secured with respect to housing 37 by aforesaid fastener assemblies 145. An elongated actuator bar 153 which extends longitudinally of housing 37 beneath flap section 85 has its inner end co-rotationally secured on shaft 148. The normal position of actuator bar 153 may be as shown in solid line in FIG. 6.

An end wall 155 (FIG. 4) of the housing 37 extends above housing cover 47. The wall 155 has an integral flat which forms a base or support 157 above the cover 47. A valved structure 159, adapted for control of hydraulic fluid, is secured on the support 157 by suitable fasteners 161 the character of which is manifest by reference to FIG. 4. Flow through said valved structure is controlled in a customary manner through the medium of an outwardly projecting valve stem 163. The latter is slidable in the valved structure and normally biased outwardly to the solid line position of FIG. 4 to prohibit flow through said valved structure. A stem control member 165 has a lower end co-rotationally arranged on shaft 148. Stem control member 165 is arranged for management of stem 163 with an upper portion abutting said stem.

As illustrated in FIG. 2, attitude control arm 129 may comprise a plurality of sections each of which, except for a variation in length which is inconsequential, functions in the same manner as the others thereof. A plurality of parallel arms 167 are spaced apart longitudinally of housing 37 to journallingly support said attitude control arms in their outer end portions. Each arm 167 is arranged for movement in a vertical plane at an angle to housing 37, and said last arms are proportioned to cause attitude control arm 129 to engage from beneath medial portions of spring arms 99 when the same are in extended position to provide a support for flap assembly 81.

Arms 167 are rockably mounted with respect to housing 37. To that end, there are provided a plurality of bent stands 169, only one of which is seen in FIG. 5. One end of each of said stands is secured to bracket 91 and its other end is secured to housing cover 47. The arrangement is such that a plurality of aligned openings 171 are fashioned longitudinally of the housing 37 above cover 47 along its inner side. An hydraulic fluid conduit 173 which is in fluid communication with valved structure 159 extends through said last mentioned openings.

A mounting strap 175 which is associated with each stand 169 extends transversely of the housing 37. One end of each strap 175 is secured by any suitable means to the top of its associated stand. A holder 177 is rigidly secured to the opposite end of each of said straps. Each of said holders has a downwardly extending part which is secured by adjacent fastener assembly 145 against aforesaid boss 143.

A pivot 179 rockably connects the inner end of each arm 167 to the inner end of an associated mounting strap 175. An anchoring pin 181 extends through the opposite end of each of said mounting straps. One end of an expansion spring 183 is rockably anchored about each pin 181. The opposite end of said expansion spring is engaged about a pin 185 which projects through a medial portion of an associated arm 167, thereby to bias such arm from an extended position counterclockwise to the solid line position of FIG. 5.

An outer end part of an hydraulic cylinder 187 is pivotally arranged about each pin 181. Its piston rod 189 is connected to an associated arm 167 by means of pin 185. Suitable duct means 191 place each cylinder 187 in fluid communication with the fluid supply conduit 173. In the present embodiment, the hydraulic system may be constructed in a conventional manner so that when valve stem 163 is moved from the solid to the dotted line position of FIG. 4, fluid pressure will develop in the system causing extension of each piston rod 189. When said valve stem is returned to the solid line position, the fluid pressure will be relieved through conduit 173, and, under the normal biasing of expansion springs 183, arms 167 will return from the phantom to the solid line position of FIG. 5 causing retraction of piston rods 189.

Having thus described the details of construction, a description of operation next ensues. A pair of fruit catchers 11, conditioned for transport as in FIG. 2 with flap assembly folded back and retracted, are arranged in approximate catching position on opposite sides of a tree 77 to be harvested. The opposed catcher apron assemblies 24 are then extended to the condition of FIG. 1, and the carriers 13 are sidled toward said tree. Once both carriers are disposed so that the flap sections 83, 87, and 89 from one fruit catcher may be overlapped with those sections of the opposed fruit catcher, an operator may manually extend spring arms 99 and condition flap assemblies 81 in extended attitude, as illustrated in FIGS. 1 and 3.

Thereafter, the carriers 13 are further sidled and adjusted so that said tree engages in opposed recesses 113. Each actuator bar 153 is arranged and proportioned so that shortly after engagement of said tree in the recesses 113, said actuator bars will be engaged and rocked by said tree from the solid line to the phantom position of FIG. 6, the fully operative condition of an actuator bar being illustrated in FIG. 3. In response to rocking of the last members, each valve stem control member 165 will move with its shaft 148 from the solid to the phantom position shown in FIG. 4 to condition each valved structure 159 for fluid flow. Thereupon, each attitude control arm 129 will be caused to rock clockwise upwardly about an axis defined by pivots 179 from a normal position. That is to say, each attitude control arm will be caused to change its condition from the solid line to the phantom position of FIGS. 4, 5, and 6, such phantom position being the same as the solid line position of FIG. 3.

Such upward movement will cause a change in attitude of overlapped flap sections 83, 87, and 89 to form a convex span between opposed outer end portions 39 of the web means 33, as illustrated in FIG. 3. Thereby, all fruit falling on said overlapped flap sections 83, 87, and 89 will be gravity fed toward one or the other of said outer end portions 39.

Simultaneously, the strips 111 will be elevated by attitude control arms 129 from the solid line to the phantom position of FIG. 6. As strips 111 are elevated, certain thereof 111A (FIG. 3) may be trapped against said tree. Those that escape, however, will be flipped inwardly under inherent material tension toward their respective carriers to be biased into tree engagement by coiled spring portions 127. A concave shield about the tree will thus be formed by strips 111 to cover a gap between the tree and said apron assemblies 24 and deflect fruit toward said outer end portions 39.

To accommodate outer contour portions of a tree are engaged in each flap assembly beyond its flap section 85, parts of each flap 89 adjoining its recess 113 may be cut away, as at 114, to minimize fabric wrinkling against the tree adjacent opposite sides of said flap sections 85.

As many substitutions or changes could be made in the above described construction, and as many apparently widely different embodiments of the invention could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a fruit catcher and the like having a frame, a web supported on said frame for disposition in fruit catching attitude about a tree and arranged for feeding caught fruit toward a collection station, deflector means mounted from said frame for gravity feed toward said web, the improvement in said deflector means comprising a pair of flap assemblies connected to said frame, a medial resilient section disposed between said flap assemblies and defining a recess for reception of a tree trunk in engagement with said medial resilient section, a power actuated attitude control means arranged for upward motivation tending to flip said medial resilient section out of tree trunk engagement and tree actuated means for triggering movement of said attitude control means, and return means arranged to impress a tree reengageable force on said medial resilient section after being flipped to form a cover extending from the tree trunk in delivery association with said web.

2. A fruit catcher as defined in claim 1 in which the medial resilient section comprises a plurality of adjoining strips having inner end portions connected to said frame and opposite sides free from said flaps, said strips when in catching condition forming a concavity.

3. A fruit catcher as defined in claim 2 in which the frame comprises a treeward frame member, said web having an outer portion anchored to said treeward frame member, said treeward frame member having tree proximate and tree distal bosses, a holder mounted on the inner end portions of said strips, a rockable arm connected to said tree proximate boss for rockable support of said holder in spaced relationship with said tree distal boss, and a flexible cover connected to said tree distal boss and said holder.

4. A fruit catcher as defined in claim 1 in which said attitude control means comprises an arm rockably mounted from said frame in supportive engagement with said flaps and said medial resilient section, and said tree engaging means comprises an actuator member arranged from said frame for engagement by a tree trunk as said web is moved into catching condition and management means operably connected to said actuator member for rocking said arm to elevate said flaps and flip said medial section upwardly.

5. A fruit catcher as defined in claim 4 in which said actuator member is rockably mounted from said frame with a portion arranged adjoining said recess for motivation by a tree trunk as said web is conditioned in catching aspect, an hydraulic assembly inclding a valved structure arranged in operable association with said actuator member and a ram assembly controlled by fluid flow in said hydraulic assembly to rock said arm.

6. A fruit catching device as defined in claim 1 in which said return means comprises biasing means rockably supoprted by said attitude control means and arranged for action upon assumption of a predetermined aspect by said attitude control arm and connection means securing said biasing means to said frame for controlled support of said medial resilient section.

7. A fruit catching device as defined in claim 6 in which said connection means comprises a pair of arms adjoining opposite sides of said medial resilient section and having lower end portions rockably connected to said frame member, said pair of arms having upper end portions disposed beneath and adjacent said medial resilient section, a shaft carried in said upper end portions, a holder connected on said resilient medial section, said biasing means comprising a spring having a medial portion arranged to support said holder and opposite end portions coiled about said attitude control means and said shaft, said resilient means proportioned to fall against a tree trunk after being flipped upwardly by said attitude control means.

8. A fruit catcher as defined in claim 2 further characterized by spring arm means having a lower end portion rockable on said frame and an upper end portion disposed adjoining said inner end portions and spring means having a medial arcuate part secured along the inner end portions of said strips and an end portion connected to said attitude control means to rock said strips about the upper end portions of said spring arm means for management of said medial resilient section.

References Cited
UNITED STATES PATENTS

| | | | |
|---|---|---|---|
| 2,436,648 | 2/1948 | Isom | 56—329 |
| 2,692,470 | 10/1954 | Boman | 56—328 |
| 3,218,790 | 11/1965 | Edgemond | 56—329 |

ROBERT PESHOCK, Primary Examiner

PASQUALE A. RAZZANO, Assistant Examiner